United States Patent [19]
Murakami et al.

[11] Patent Number: 5,630,610
[45] Date of Patent: May 20, 1997

[54] ADAPTABLE VEHICULAR AIR BAG INSTALLATION ARRANGEMENT

[75] Inventors: Takashi Murakami; Hirohiko Kikuchi, both of Omiya, Japan

[73] Assignee: Kansei Corporation, Saitama, Japan

[21] Appl. No.: 499,574

[22] Filed: Jul. 7, 1995

[30] Foreign Application Priority Data

Jul. 7, 1994 [JP] Japan ................. 6-155937

[51] Int. Cl.$^6$ ................................................. B60R 21/16
[52] U.S. Cl. .................. 280/728.2; 280/732; 280/743.1
[58] Field of Search ............................ 280/728.1, 728.2, 280/728.3, 731, 732, 743.1

[56] References Cited

U.S. PATENT DOCUMENTS

| | | | |
|---|---|---|---|
| 4,332,398 | 6/1982 | Smith | 280/732 |
| 4,964,654 | 10/1990 | Bishop et al. | 280/743 |
| 5,058,921 | 10/1991 | Cuevas | 280/741 |
| 5,074,584 | 12/1991 | Jarboe | 280/728.2 |
| 5,209,519 | 5/1993 | Shiga et al. | 280/728.2 |
| 5,240,282 | 8/1993 | Wehner et al. | 280/728 |
| 5,303,951 | 4/1994 | Goestenkors et al. | 280/728.3 |

FOREIGN PATENT DOCUMENTS

| | | | |
|---|---|---|---|
| 0 619 204 | 10/1994 | Germany . | |
| 5-278551 | 10/1993 | Japan | 280/728.3 |
| 6-107106 | 4/1994 | Japan . | |

Primary Examiner—Paul N. Dickson
Attorney, Agent, or Firm—Foley & Lardner

[57] ABSTRACT

A vehicular air bag installation arrangement for a passenger includes an instrument panel having an elongated recessed compartment formed therein. The recessed compartment includes a front side open to a front side of the instrument panel and dimensioned to act as a unit case for an air bag module. The air bag module is sub-assembled and includes a base member shaped to act as a bracket within the recessed compartment, an inflater mounted within the base member and an air bag, which is folded in front of the inflater, and includes two extending edge portions wrapped around the outside of the base containing the inflater. The extending edge portions include bolt holes that engage weld bolts projected from the outer side of the base member. The weld bolts are then used to mount the base member within the recessed compartment.

14 Claims, 6 Drawing Sheets

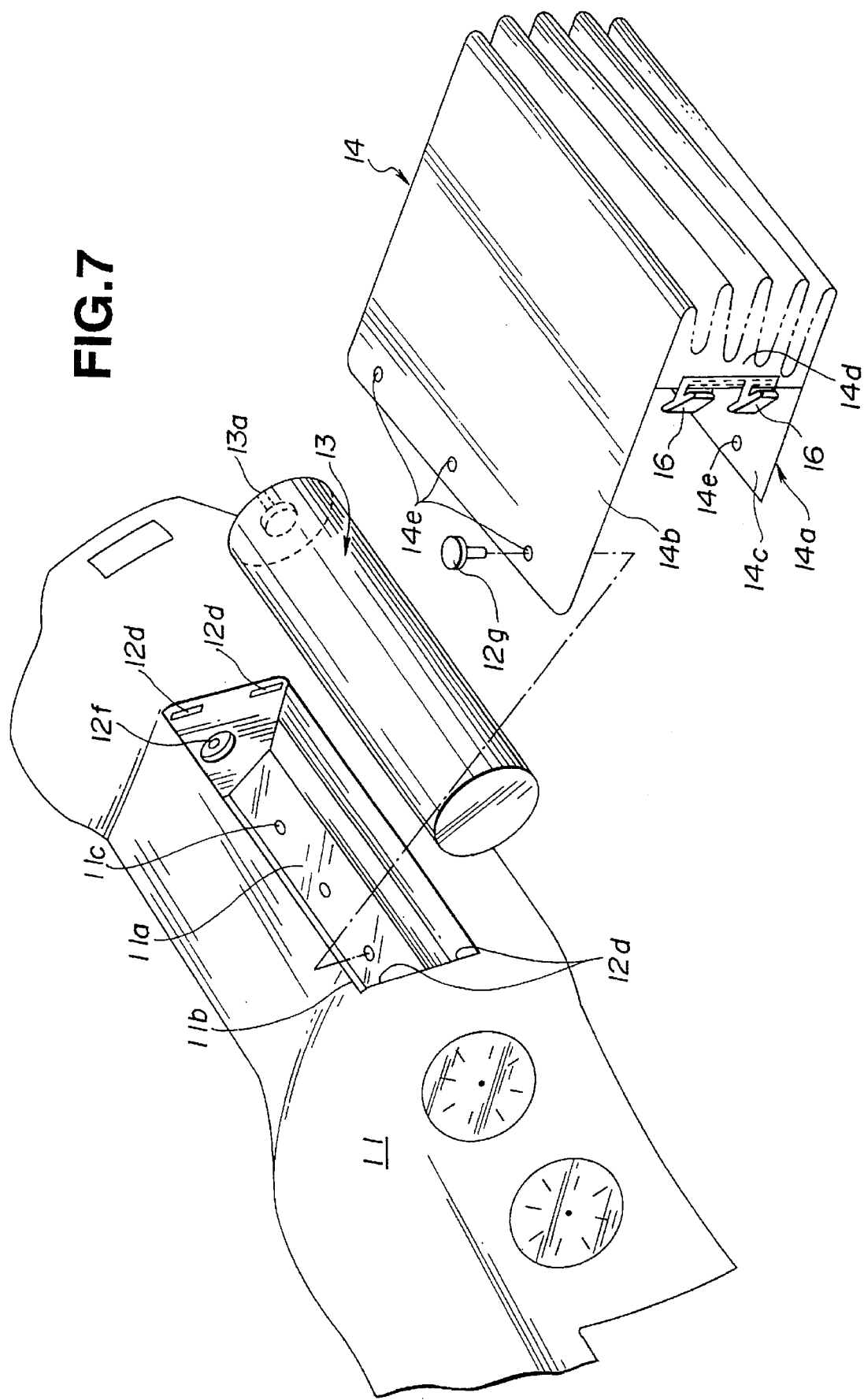

5,630,610

ADAPTABLE VEHICULAR AIR BAG INSTALLATION ARRANGEMENT

BACKGROUND OF THE INVENTION

1. Field of the Invention

The present invention relates generally to an air bag installation arrangement for a passenger of an automotive vehicle. Specifically, the present invention relates to an installation arrangment having an instrument panel, which may be adapted for vehicles with or without a passenger air bag.

2. Description of the Related Art

There has been proposed, for installation of air bags for a passenger of an automotive vehicle, to install the air bag unit (i.e. an air bag and inflation device therefor operably mounted) in a recess provided in the instrument panel of the vehicle.

However, although the above arrangement provides favorable mounting characteristics for the passenger air bag, there is a drawback in that not every unit of a particular make of vehicle is designated to be equipped with a passenger air bag. Thus, assembly of vehicles having a passenger air bag requires a certain number of parts and assembly procedures different from those of vehicles of the same make and model to be delivered without a passenger air bag. Provision of different parts raises costs and impedes smooth assembly of such vehicle.

Accordingly, the present invention proposes an air bag installation arrangement for a vehicular passenger in which the same instrument panel may be used in assembly of vehicles with passenger air bags and those without.

In addition, in the case of certain vehicles, it is desirable that an instrument panel made of synthetic resin or the like, be molded in a single process. However, according to the related art, it is necessary to install an air bag unit separately of the instrument panel since an air bag inflation device generates heat levels high enough to damage or deform the synthetic resin.

Thus, it has been required to provide an air bag installation arrangement having major components adapted for both vehicles with and without passenger position air bags. It is further desirable to provide an air bag installation arrangement in which an inflation device and an air bag may be integrally installed with molded components.

SUMMARY OF THE INVENTION

It is therefore a principal object of the present invention to overcome the drawbacks of the related art.

It is a further object of the present invention to provide an air bag installation arrangement, the major components of which are adaptable to automotive vehicles with or without air bag installations.

It is a further object of the invention to provide an air bag installation arrangement in which an inflation device and an air bag may be integrally installed with molded components.

In order to accomplish the aforementioned and other objects, there is provided a vehicular air bag installation arrangement for a passenger, comprising: an instrument panel positioned before a passenger position within a vehicle; a recessed compartment formed in the instrument panel, the recessed compartment including a front side thereof open to a front side of the instrument panel; first engaging means formed within the recessed compartment; a foldable air bag; inflation means actuable for generating a gas capable of timely and sufficiently inflating the air bag, wherein the air bag is folded such that extended portions thereof surround the inflation means, and the inflation means and the folded air bag being dimensioned to substantially equal an internal space of the recessed compartment and adapted to be packable snugly therein; second engaging means securely attached to side portions of the folded air bag for engaging with the first engaging means of the recessed compartment when the air bag and the inflation means are packed within the recessed compartment; and a lid member openably mounted over an open side of the recessed compartment, wherein the extended portions of the air bag are wrapped around the inflation means to act as an insulative layer between the inflation means and the recessed compartment such that heat generated by the inflation means is not directly imparted to the recessed compartment, to prevent deformation thereof as a result of air bag operation.

BRIEF DESCRIPTION OF THE DRAWINGS

In the drawings:

FIG. 7 is an exploded perspective view of an air bag installation according to an alternative embodiment of the invention.

DESCRIPTION OF THE PREFERRED EMBODIMENT

Referring to the accompanying drawings FIGS. 1–5, a preferred embodiment of the invention will be described hereinbelow in detail.

Figure 1:
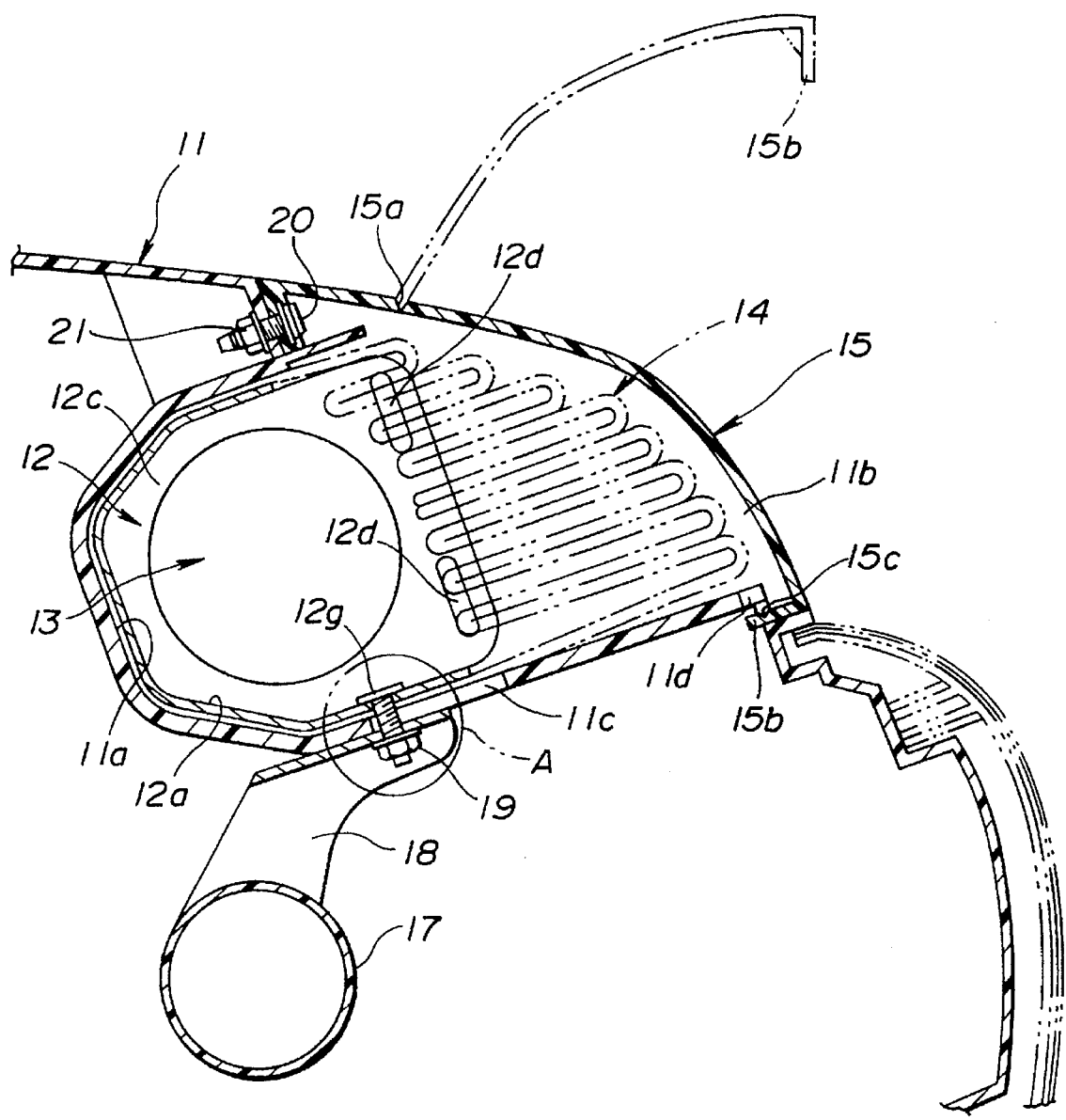
FIG. 1 is a cross-sectional view of a passenger air bag installation according to a first preferred embodiment of the invention.

As may be seen in FIG. 1, a cross-sectional view an instrument panel 11, formed of synthetic resin, or the like, includes a recess 11a. An open portion 11b of the recess 11a faces a front side of the instrument panel 11, that is toward a passenger position within the vehicle interior (not shown).

The installation arrangement of the invention further provides a base member 12, an inflater 13 and an air bag 14 configured to be installable within the recess 11a of the instrument panel 11. The open portion 11b of the recess 11a may be closed by a lid member 15.

Figure 2:
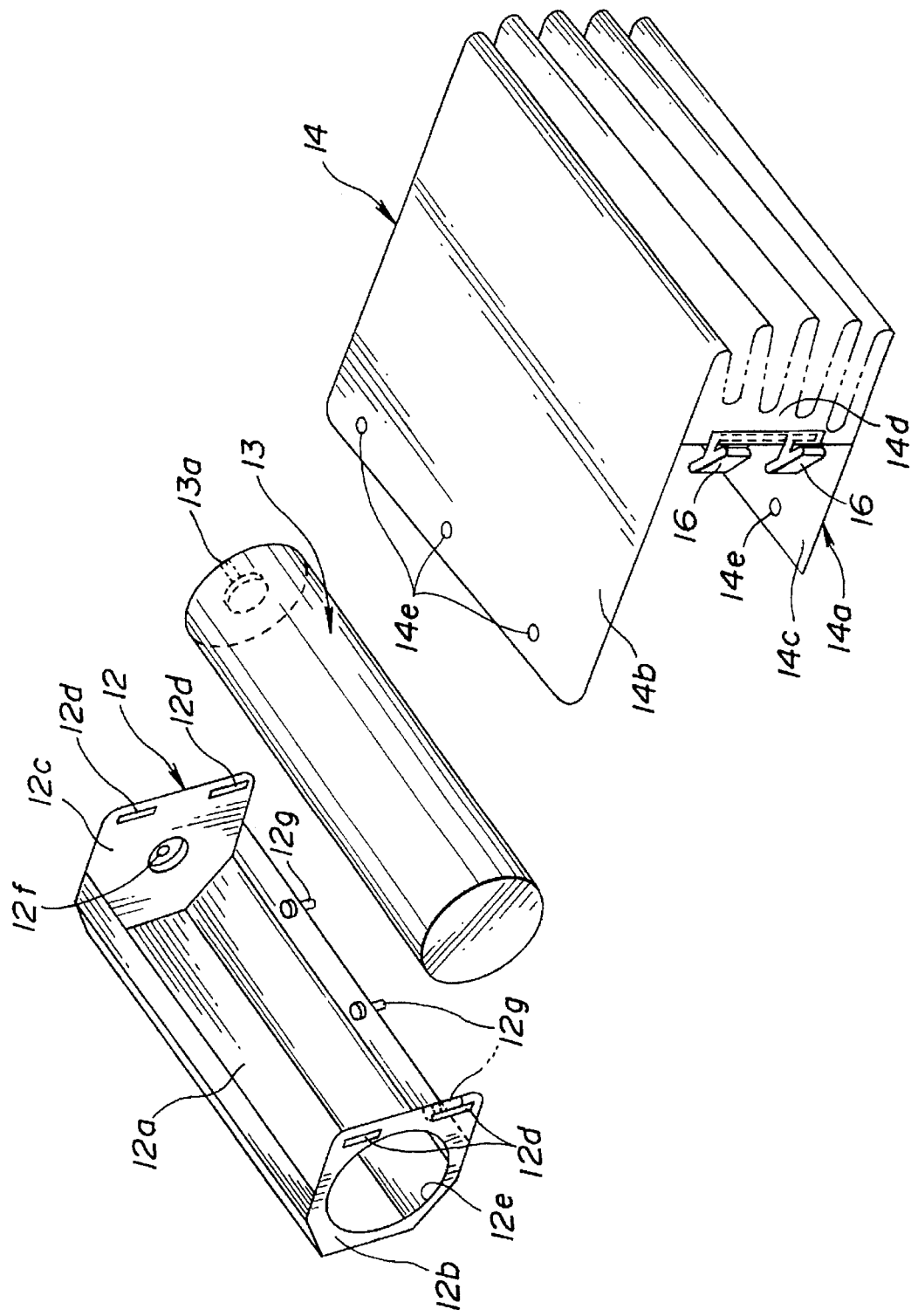
FIG. 2 is an exploded perspective view of subassembly components of the air bag installation arrangement according to the invention.

As may be seen in detail in FIGS. 1 and 2, the base portion 12 includes a bottom wall 12a and side walls 12b, 12c perpendicular to the longitudinal direction of the bottom wall 12a. Each of the side walls 12b and 12c are formed with engaging slits 12d, 12d that engage with a pair of clips 16 fastened to opposed sides of the air bag 14, as will be described in detail below. According to the present embodiment, a substantially large circular opening 12e is defined in the side wall 12b for accepting the cylindrical inflater therethrough 18 and a smaller circular opening 12f is defined in the side wall 12c for accepting a bolt 13a therethrough. The bolt 13a is projected from one side of the inflater 13, as seen in FIG. 2. Further, a portion of the bottom wall has a plurality of weld bolts 12g projected therefrom. According to the present embodiment, the weld bolts are projected downwardly and are arranged in longitudinal alignment.

As also, seen in FIG. 2, the air bag 14 is folded into a basically rectangular shape having upper and lower extended portions 14b, 14c that extend rearwardly of the front side of the air bag 14 (i.e. in the direction of the vehicle front) beyond the plurality of folds 14d, . . . comprising the main body of the air bag 14. According to the present embodiment, the upper extended portion 14b extends further than the lower edge portion 14c. Leading edges of each of the extended portions 14b, 14c are formed with a plurality of bolt holes 14e corresponding to the number of weld bolts 12g of the base member 12.

Figure 3:
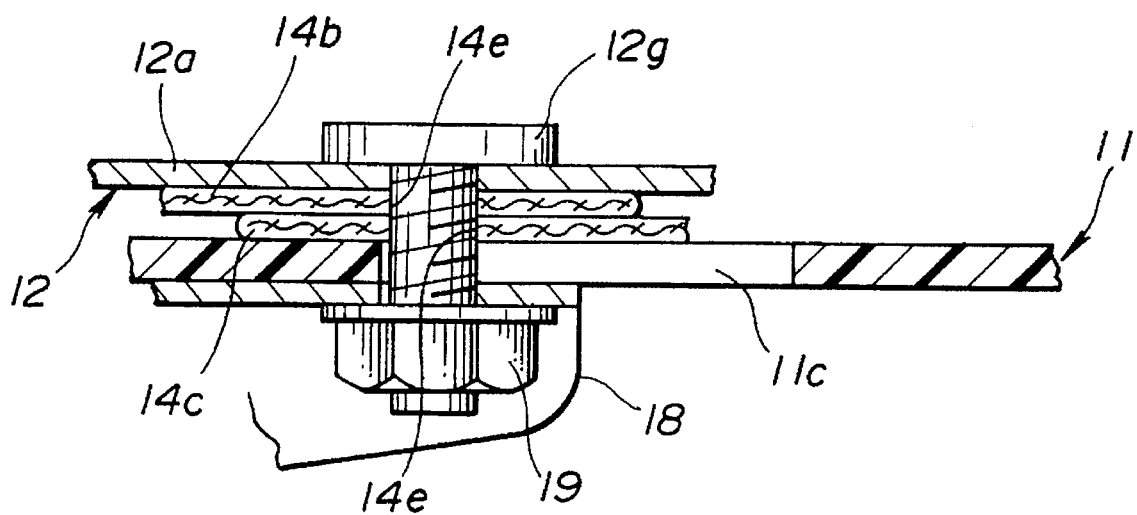
FIG. 3 is a cross-sectional view of a weld bolt arrangement for retaining the air bag according to the invention.

According to the above structure, as best seen in FIG. 1, the extended portions 14b, 14c are wrapped around and outer side of the bottom wall 12a of the base member 12 to a position where the respective bolt holes 14e thereof can engage the weld bolts 12g of the bottom wall 12a in as manner such as shown in FIG. 3. The extended portions 14b, 14c thus form an insulative layer between the outer side of the bottom wall 12a of the base member 12 and the inner wall of the recess 11a.

It will be noted that, according to the present embodiment, the upper extended portion 14b is provided to be longer that the lower extended portion 14c such that the bolt holes 14e of the upper and lower extended portions may overlap at a position corresponding to a lower side of the recess 11a corresponding to a lower edge portion of the bottom wall 12a. However, as will be set forth in greater detail below, the invention is not limited to this arrangement.

The rearward sides of the smaller folds 14d have the pair of clips 16 attached to each longitudinal side thereof by sewing, for example, for insertion into the engaging slit 12d provided at each side wall 12b, 12c of the base member 12.

Figure 4:
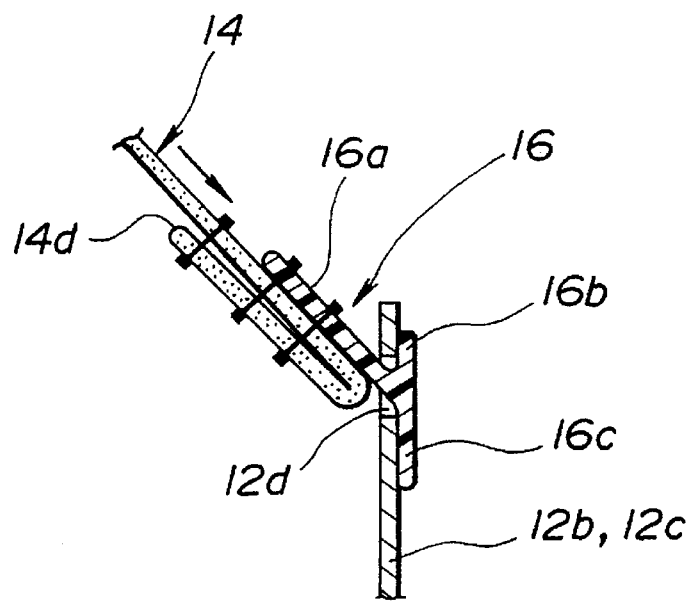
FIG. 4 is a cross-sectional view of an elastically resilient clip utilized in the air bag arrangement of the invention.

Each clip 16 is made of synthetic resin or the like that is resiliently deformable. Referring to FIG. 4, each clip 16 has a generally Y-shaped cross-section. Preferrably, a flexible material having high impact strength, such as thermoplastic polyurethane resin or the like, is used. As may be seen in FIG. 4, the clip 16 comprises three portions, an initially inserted lower portion 16c, a catch portion 16b, which is inserted into the slit 12d after the lower portion 16c and projects upward to prevent the clip 18 from being pulled out of the slit 12d, and a attachment portion 16a projecting angularly outwardly of the slot 12d from the lower and catch portions 16c, 16b and slits affixed to the rear sides of the folds 14d of the air bag 14. As may be seen, according to the present embodiment, the attachment portion joined to the air bag 14 by sewing.

Thus, according to the construction as set forth above, the inflater 13 is fully inserted into the large circular opening 12e of the side wall 12b of the base member such that the bolt 13a thereof projects through the smaller circular opening 12f of the side wall 12c. The inflater 13 may thus be secured in the base member 12 by a nut (not shown). then, the air bag may be packed in front (relative to the vehicle interior) of the inflater 13 such that the clips 16 are inserted into the engaging slits 12d as described above and the extended portions 14b, 14c of the air bag are wrapped around the outer side of the bottom wall 12a of the base member 12 such that the bolt holes 14e, 14e engage the downwardly projected weld bolts 12g. The entire assembly of base member 12, inflater 13 and air bag 14 may then be packed snugly into the recess 11a of the instrument panel 11.

As noted above, the extended portions 14b, 14c of the air bag thus are disposed to act as an insulative layer between the inflater 13 (via the bottom wall 12a of the base member 12 at some locations) and the walls of the recess 11a to protect the recess 11a of the instrument panel 11, which is formed of synthetic resin or similar material, from damage due to heat generated by the inflater 13 during activation.

Referring again to FIG. 8, the lower side of the recess 11a is provided with a plurality of elongate guide slits 11c into which the weld bolts 12g are respectively inserted. The weld bolts are then secured to the instrument panel via nuts 19 and with a bracket 18 attached to a steering member 17, or other suitably stable portion of the vehicular chassis.

Hereinbelow, a structure of the lid member 15 according to the present embodiment will be described in detail.

As will be noted from FIG. 1, the lid member 15 is attached to the instrument panel 11 at an upper side of the opening 11b. According to the present embodiment, the side of the lid member 15 to be attached to the instrument panel 11 is formed with a flanged portion and attached to the instrument panel 11 via a plurality of bolts 20 and nuts 21. It will be noted however that other means of attachment may be utilized. Proximate the edge portion at which the lid member 15 is attached to the instrument panel 11, a thin hinge 15a is formed in the lid member, parallel to an upper edge of the recess 11a. The thin hinge 15a may comprise a linear reduced thickness portion formed during molding of the lid member, or other low-profile hinge structure.

The major portion of the lid member is shaped substantially in conformance with the contour of the instrument panel 11 to cover the opening 11b of the recess 11a with a unified and consistent surface appearance.

Figure 5:
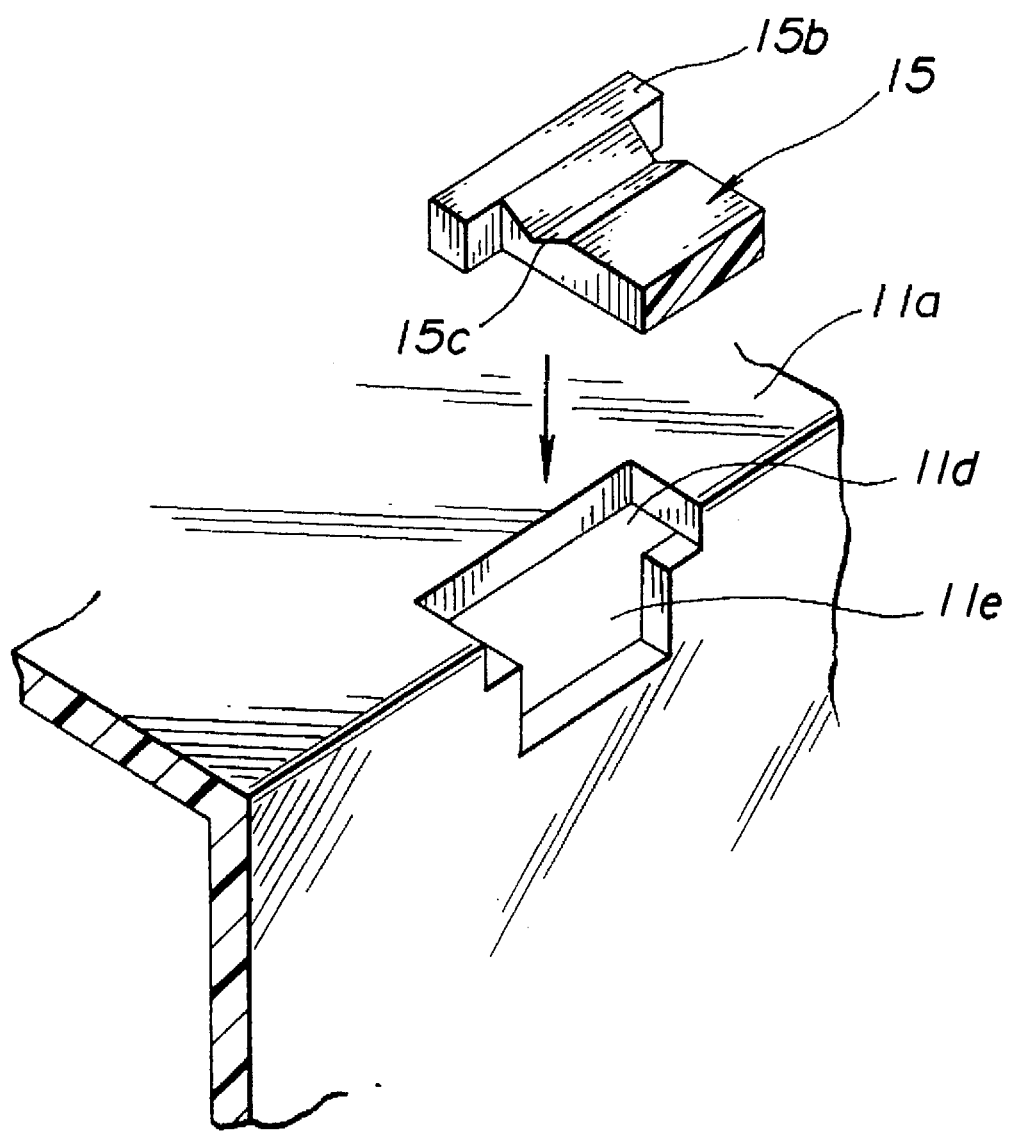
FIG. 5 is a perspective view showing a closing member formed on a lid member and utilized for retaining the lid member in place over a recess mounting the subassembly components shown in FIG. 2.

Referring to FIG. 5, a movable edge of the lid member 15, that is an leading edge opposite and parallel to the thin hinge 15a, has a plurality of inwardly projecting closing members comprised of a reduced thickness portion 15c, which projects inwardly substantially perpendicular to the leading edge of the lid member 15, and a closing lip 15b is formed, as a substantially rectangular bar disposed longitudinally at an inner end of the reduced thickness portion 15c.

Correspondingly, at a lower edge of the opening 11b of the recess 11a, an engaging slot is formed which comprises an elongated insert opening 11d adaptable to receive the closing lip 15b, and a cut-out portion 11e extending substantially perpendicularly downward from the insert opening 11d and adapted to receive the reduced thickness portion 15c. In the present embodiment, the cut-out portion 11e is smaller in width than the insert opening 11d. According to this structure, as may be appreciated from FIG. 5, when the lid is closed, the reduced thickness portion 15c is inserted into the cut-out portion 11e via the insert opening to engage the sides of the cut-out portion 11e, while the closing lip 15b fits through the insert opening 11d such that a front surface thereof is tightly fitted against a rear side of the instrument panel 11.

According to this, the lid member 15 may be securely closed. However, at a time of activation of the inflater 13 whereupon a gas under high pressure will be generated within the recess 11a, the expansion of tile air bag 14 by force of the gas under pressure released by the inflater 13 is sufficient to break or tear the reduced thickness portion of the closing members. The lid member 15 will open rapidly at the thin hinge 15a allowing the air bag 14 to fully inflate within the vehicle cabin.

On the other hand, if the above described instrument panel is to be used with a vehicle equipped with a passenger air bag, the lid member 15 may be suitably equipped with latch means such that the elongate recess 11a may be utilized as a glove box or storage compartment, accessible via the opening 11b. According to this arrangement the lid member will be openable and closable along the thin hinge 15a. Thus, identical instrument panels 11 including the recess 11a and the opening 11b, as well as lid members 15 in addition to nut, bolts, etc., used for securing the instrument panel may be utilized both in vehicles to be equipped with a passenger side air bag and vehicles not so equipped.

Figure 6:
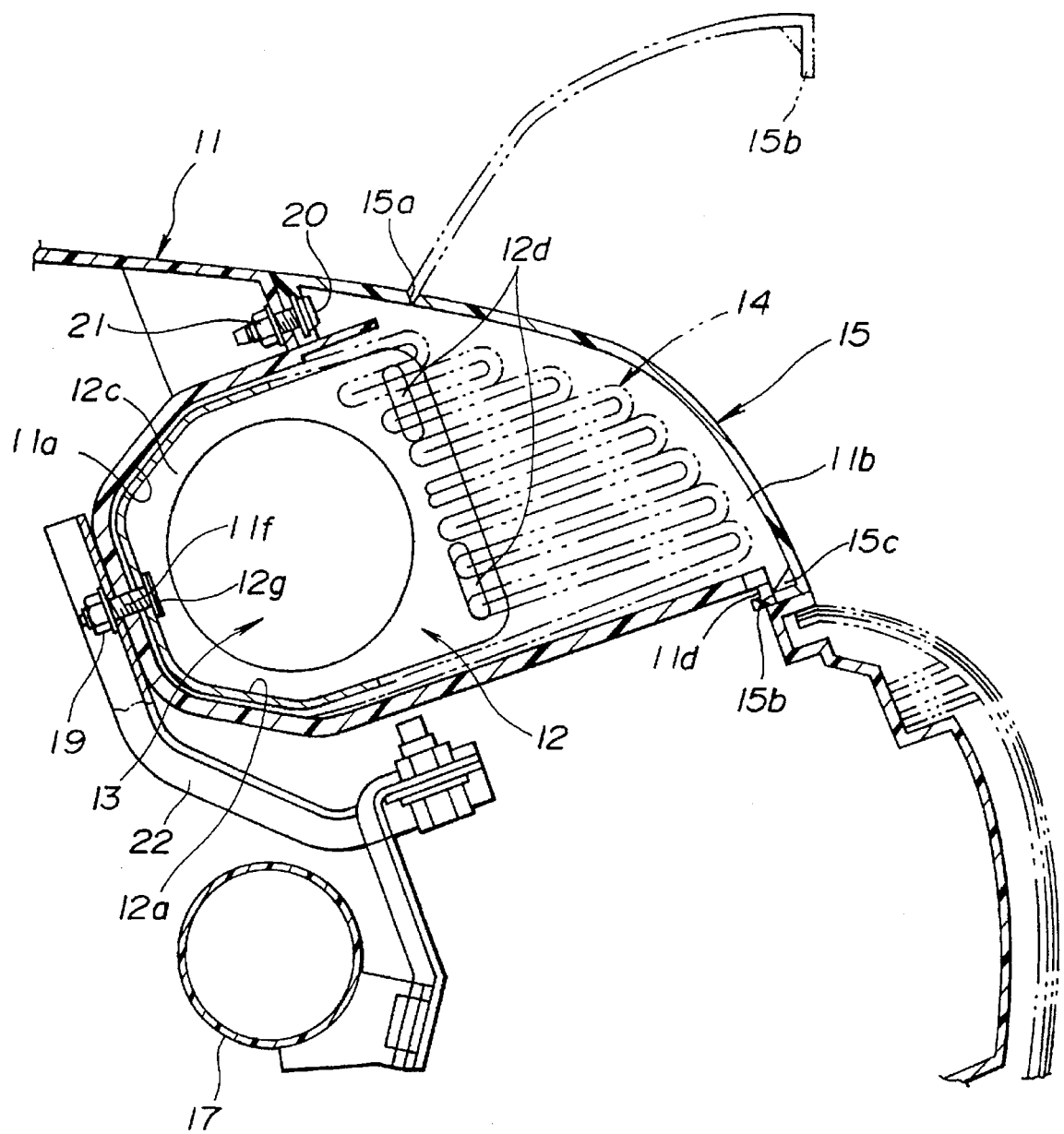
FIG. 6 is a cross-sectional view of a passenger air bag installation according to a second preferred embodiment of the invention.

Referring now to FIG. 6, an alternative embodiment of the installation arrangement according to the present invention will be described. As may be seen, the base member 12, the air bag 14 and the recess 11a is be adapted such that the bolt holes 14e of the air bag 14, the guide slits 11c and the weld bolts of the base member 12 (i.e. the area of the circle A of FIG. 1) align at a rear center portion of the recess 11a. According to this arrangement, the weld bolts 12g project substantially horizontally from the base member 12, for example, at a rear longitudinal center line of the bottom wall 12a of the base member 12. The present embodiment provides passing holes 1if for receiving the weld bolts 12g at a rear wall of the recess 11a (i.e. a deepest portion of the recess). According to this arrangement, the upper and lower extending portions 14b, 14c of the air bag 14 are made to be substantially equal in length. Thus the expansion force of the air bag 14 is supported in a balanced manner when the air bag 14 is activated.

Further, according to the second embodiment, the nuts 19 engage the weld bolts 12g for securing the weld bolts 12g to a bracket 22 extending from the steering member. The structure of the second embodiment enjoys all the advantages of the above-described first embodiment.

According to the invention, even when extreme pressures are generated according to inflation of the air bag, since the extended portions of the air bag 14 closely surround the inflater 13 within the space of the recess 11a, a large contact area between the inflater 13/air bag 14/recess 11a is present. Thus pressure may be evenly distributed and inflation operation of the air bag 14 fully supported structurally by the above-described components.

In addition, according to the above-described structure, the passenger air bag 14 may be provided at low cost with a reduced number of parts. Further, the instrument panel 11 may be made inexpensively of synthetic resin without incurring damage due to activation of an air bag inflater 13, since the air bag 14 is tightly sandwiched between the inflater 13 and the inner walls of the recess 11a to act as insulation means for protecting the recess 11a.

Also, the recess 11a is provided automatically during molding of the instrument panel 11, thus a number of parts and process steps during manufacture is reduced. The recess 11a effectively comprises a case for an air bag unit, integrally formed with a vehicle dashboard-instrument panel 11.

It will be noted that the adaptable air bag installation arrangement according to the invention is not limited to the above described structure, but may be modified in various ways within the inventive concept of the invention. For example, the lid member may be attached at a lower side of the recess 11a such that the lid member 15 opens outwardly and downwardly.

Further, the air bag according to the present invention has been described in terms of the preferred embodiment, including a base member 12. However, as may be seen in FIG. 7, it is possible to implement the air bag installation arrangement of the invention without provision of such a base member 12 by configuring the side walls of the recess 11a in a manner similar to the side walls of the described base member 12 such that the air bag 14 may be wrapped directly around the inflater 13 to engage weld bolts 12g provided through the rear wall of the recess 11a and attached to a front side of the recess 11 directly via engaging slits 12d formed in the side walls of the recess 11. Thus costs and parts are further reduced and installation is simplified. For increased mounting stability a metal reinforcing plate (not shown) may be provided at an outer side of the recess 11a with holes corresponding to guide holes 11c that receive the weld bolts 12g.

Further, it will be noted that, although the invention is disclosed in relation to a passenger air bag for an automotive vehicle, it is not limited thereto. The passenger air bag according to the invention may be implemented in any type of vehicle having any type of passenger arrangement, seating arrangement etc.

Thus, while the present invention has been disclosed in terms of the preferred embodiment in order to facilitate better understanding thereof, it should be appreciated that the invention can be embodied in various ways without departing from the principle of the invention. Therefore, the invention should be understood to include all possible modifications thereof that can be embodied without departing from the principle of the invention as set forth in the appended claims.

What is claimed is:

1. A vehicular air bag installation arrangement for a passenger, comprising:

an instrument panel positioned before a passenger position within a vehicle;

a recessed compartment in said instrument panel, said recessed compartment including a front side thereof open to a front side of said instrument panel;

first engaging means within said recessed compartment;

a foldable air bag;

inflation means actuatable for generating a gas capable of timely and sufficiently inflating said air bag, wherein said air bag is folded such that extended portions thereof surround said inflation means, and said inflation means and said folded air bag being dimensioned to substantially equal an internal space of said recessed compartment and adapted to be packable snugly therein;

second engaging means securely attached to side portions of said folded air bag for engaging with said first engaging means of said recessed compartment when said air bag and said inflation means are packed within said recessed compartment; and a lid member openably mounted over an open side of said recessed compartment, wherein said extended portions of said air bag are wrapped around said inflation means to act as an insulative layer between said inflation means and said recessed compartment such that heat generated by said inflation means is not directly imparted to said recessed compartment, to prevent deformation thereof as a result of air bag operation.

2. A vehicular air bag installation arrangement as set forth in claim 1, further including a base member having a bottom wall substantially corresponding to a size and cross-sectional shape of said recessed compartment such that said base member is positioned within said internal space of said recessed compartment while said inflation means is installed in said base member, said base member further including first and second vertical side walls at each end of said bottom wall, which vertical side walls are formed with said first engaging means of said recessed compartment.

3. A vehicular air bag installation arrangement as set forth in claim 2, wherein an opening is defined in said first vertical side wall of said base member, said opening being dimensioned to allow said inflation means to be inserted into said base member therethrough.

4. A vehicular air bag installation arrangement as set forth in claim 1, wherein said lid member is pivotally connected to an upper horizontal edge of said front side of said recessed compartment.

5. A vehicular air bag installation arrangement as set forth in claim 4, further including a plurality of inwardly projecting closing members comprised of:

a reduced thickness portion projecting inwardly of said recessed compartment substantially perpendicularly to an edge of one end of said lid member;

a closing lip portion formed as a substantially rectangular bar disposed longitudinally at an inward end of each reduced thickness portion;

an engaging slot, formed at a lower edge of said opening of said recessed compartment, and formed as an elongated insert opening receivable of said closing lip portion and a cut-out portion extending substantially perpendicularly downwardly from said elongated insert opening and receivable of the reduced thickness portion, said cut-out portion being smaller in width than the insert opening.

6. A vehicular air bag installation arrangement as set forth in claim 2, wherein a portion of said bottom wall has a plurality of weld bolts projected from an outer side thereof, said air bag being folded into a basically rectangular shape having upper and lower extended portions extending rearwardly of the front side of the air bag in the direction of the vehicle front, edges of each of the extended portions being formed with a plurality of bolt holes corresponding to said weld bolts, said upper and lower extended portions being wrapped around upper and lower outer sides of said bottom wall to a position where the respective bolt holes thereof engage the weld bolts of the bottom wall.

7. A vehicular air bag installation arrangement as set forth in claim 6, wherein a lower side of the recessed compartment is provided with a plurality of elongated guide slits into which the weld bolts are respectively inserted to be secured to the instrument panel with bolts and a bracket attached to a steering member.

8. A vehicular air bag installation arrangement as set forth in claim 6, wherein said weld bolts are projected substantially horizontally from said bottom wall of said base member.

9. A vehicular air bag installation arrangement as set forth in claim 6, wherein said weld bolts are projected substantially vertically from said bottom wall of said base member.

10. A vehicular air bag installation arrangement as claimed in claim 1, wherein said recessed compartment includes side walls on which said first engaging means is integrally formed.

11. A vehicular air bag installation arrangement as set forth in claim 10, wherein said first engaging means is formed as a pair of engaging slits formed on said side walls, said engaging slits engaging said second engaging means formed as a pair of clips when said air bag and said inflation means are packed within said recessed compartment.

12. A vehicular air bag installation arrangement as set forth in claim 11, wherein said clips are made of a resiliently deformable material.

13. A vehicular air bag installation arrangement as set forth in claim 11, wherein each clip has a substantially Y-shaped cross-section, including three portions comprising a lower portion, a catch portion, and an attachment portion, said lower portion being initially inserted into one of said slits, said catch portion being inserted into said slit after said lower portion and projecting upwardly, preventing the clip from being pulled out of the slit, and said attachment portion being projected angularly outward of said slit from said lower and catch portions, said attachment portion being affixed to rear sides of folded portions of said air bag.

14. A vehicular air bag installation arrangement as set forth in claim 13, wherein said attachment portion is joined to the air bag by sewing.

* * * * *